United States Patent [19]

Fujimura

[11] Patent Number: 5,247,692
[45] Date of Patent: Sep. 21, 1993

[54] MULTIPLE FILE SYSTEM HAVING A PLURALITY OF FILE UNITS HOLDING THE SAME FILES IN WHICH LOSS OF DATA IS PREVENTED IN A FAILURE OF A FILE UNIT

[75] Inventor: Masanori Fujimura, Tokyo, Japan
[73] Assignee: NEC Corporation, Tokyo, Japan
[21] Appl. No.: 911,789
[22] Filed: Jul. 10, 1992

Related U.S. Application Data

[63] Continuation of Ser. No. 307,486, Feb. 8, 1989, abandoned.

[30] Foreign Application Priority Data

Feb. 8, 1988 [JP] Japan .................. 63-27279

[51] Int. Cl.$^5$ .......................................... G06F 11/16
[52] U.S. Cl. ........................... 395/800; 395/575; 395/750; 364/707; 364/DIG. 1; 364/273.4
[58] Field of Search .............. 395/550, 800, 750, 575, 395/375; 364/707

[56] References Cited

U.S. PATENT DOCUMENTS

| Re. 33,521 | 1/1991 | Mori et al. | 364/200 |
|---|---|---|---|
| 3,803,568 | 4/1974 | Higashide | 371/8.1 |
| 4,207,609 | 6/1980 | Luiz et al. | 364/200 |
| 4,228,496 | 10/1980 | Katzman et al. | 364/200 |
| 4,237,533 | 12/1980 | Mills et al. | 364/200 |
| 4,450,521 | 5/1984 | McDonough et al. | 364/200 |
| 4,486,826 | 12/1984 | Wolff et al. | 364/200 |
| 4,491,914 | 1/1985 | Sujaku | 395/700 |
| 4,593,349 | 6/1986 | Chase et al. | 395/750 |
| 4,598,355 | 7/1986 | Shepler et al. | 364/184 |
| 4,654,819 | 3/1987 | Stiffler et al. | 364/200 |
| 4,739,469 | 4/1988 | Oshiage et al. | 371/8.1 |
| 4,750,040 | 6/1988 | Hakamada | 365/229 |
| 4,775,976 | 10/1988 | Yokoyama | 364/187 |
| 4,885,683 | 12/1989 | Coogan | 364/200 |
| 4,928,279 | 5/1990 | Muroi | 371/8.2 |
| 4,941,087 | 7/1990 | Kap | 364/187 |
| 4,975,838 | 12/1990 | Mizuno et al. | 364/200 |
| 4,987,317 | 1/1991 | Pournain et al. | 364/707 |
| 5,043,871 | 8/1991 | Nishigaki et al. | 364/200 |
| 5,051,887 | 9/1991 | Berger et al. | 364/200 |
| 5,148,540 | 9/1992 | Beardsley et al. | 395/575 |

Primary Examiner—Thomas C. Lee
Assistant Examiner—Mehmet Geckil
Attorney, Agent, or Firm—Foley & Lardner

[57] ABSTRACT

A multiple file system having multiple identical file units each holding the same data files identified by a chronological revision number. Each file unit, in addition to magnetic data storage, contains input receiver and output driver stages which can be inhibited by a prohibition signal generated by a latch relay circuit in a corresponding file unit to keep the other file unit inactive when a failure occurs in the other file unit. Upon return of the other file to normalcy, the corresponding file is reset to discontinue the prohibition signal and the revision numbers of corresponding files in each file unit are compared to replace the file contents having the older revision number with the file contents having the newer revision number.

6 Claims, 2 Drawing Sheets

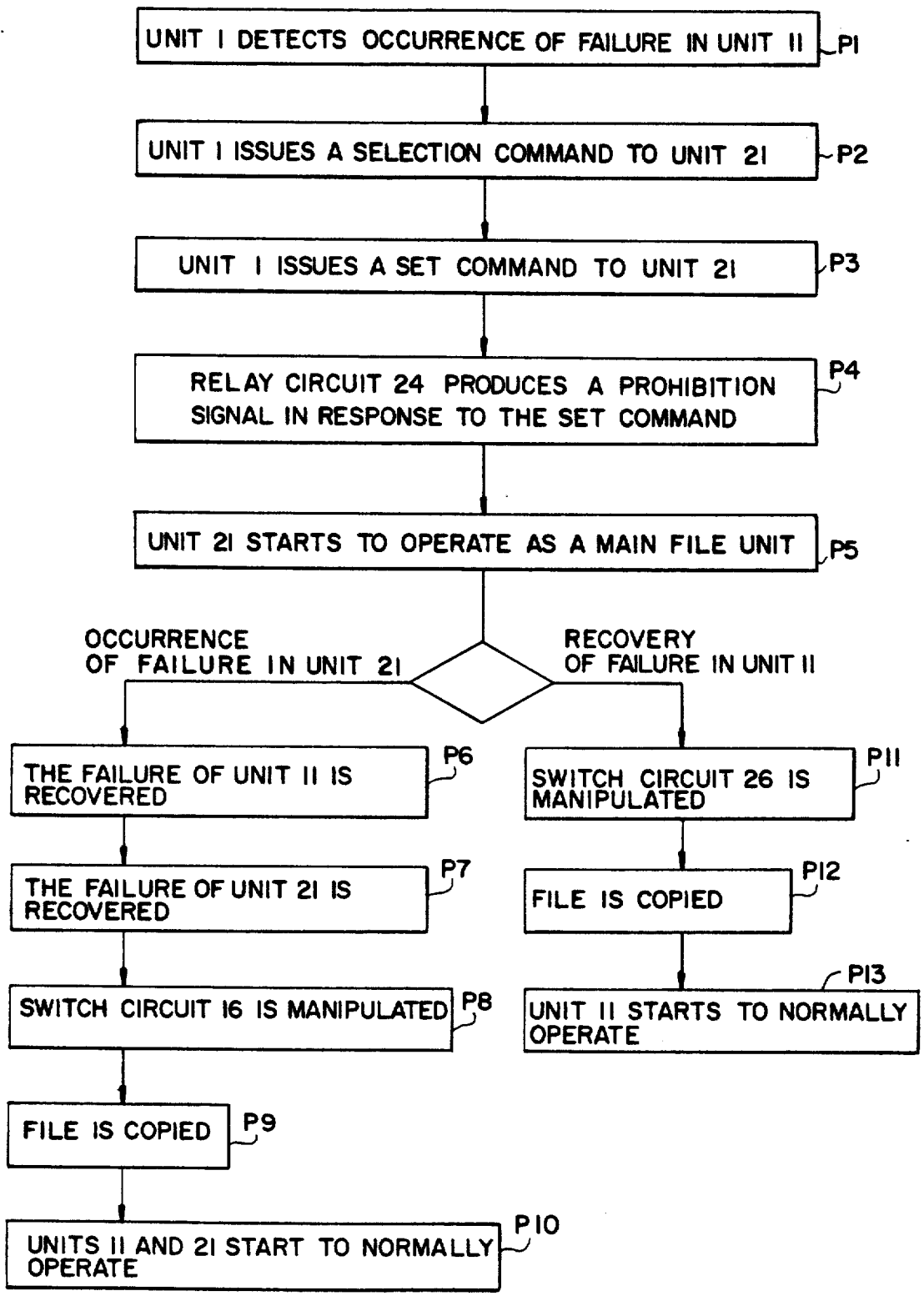

MULTIPLE FILE SYSTEM HAVING A PLURALITY OF FILE UNITS HOLDING THE SAME FILES IN WHICH LOSS OF DATA IS PREVENTED IN A FAILURE OF A FILE UNIT

This application is a continuation of application Ser. No. 07/307,486, filed Feb. 8, 1989, now abandoned.

BACKGROUND OF THE INVENTION

The present invention relates to a multiple file system.

Multiple file systems have been used to achieve computer systems of higher availability and higher reliability. A well-known multiple file system comprises a first file unit and a second file unit such as a disk unit. The first and second file units are controlled so as to constantly hold the same files of data, each of which is accompanied by a revision number (e.g. date and time). The revision number is updated whenever data included in the corresponding file are updated. If a failure arises in the first file unit, only the files held in the second file unit can be updated and the revision numbers of the updated files are accordingly updated. Upon recovery from the failure in the first file unit, file-copying processing then takes place, so that the revision numbers of each pair of corresponding files in the two file units are compared and, for each pair of files whose revision numbers are found different, all the data of one file of the pair having the older revision number is replaced with those of the other file having the newer revision number.

The conventional multiple file system, however, has the following disadvantage. If a write request for updating a file (A) arises after a first failure occurs in the first file unit, data (B) of the file A in the second file unit are updated into data (C) without data (B) of the file (A) in the first file unit being updated. Next, when the first file unit recovers from the first failure after occurrence of a second failure in the second file unit, the above-mentioned file-copying processing cannot take place because the second file unit is in trouble at this time. If another write request for updating the file (A) arises after that, data (D) of the file (A) (whose data (B) have not updated) held in the first file unit are updated. Upon recovery of the second file unit from the second failure after that, all the data of the file (A) in the second file unit is replaced with all the data of the file (A) in the first file unit, and consequently data (C) are lost.

An object of the invention is, therefore, to provide a multiple file system free from the above-mentioned disadvantage.

SUMMARY OF THE INVENTION

According to an aspect of the invention, there is provided a multiple file system which comprises a host unit, a control unit responsive to an access request issued from the host unit for issuing a sequence of commands, and a plurality of file units whose operation is controlled by the sequence of commands. The system further comprising:

receiver circuits provided in one-to-one correspondence with the file units and receiving the commands;

a plurality of indicator circuits provided in one-to-one correspondence with the file units, a specific one of the indicator circuits designated by a set command issued by the control unit producing a prohibition signal; and prohibiting means responsive to the prohibition signal for prohibiting a specific one of the receiver circuits corresponding to a specific one of the file units corresponding to the specific indicator circuit from receiving the commands

BRIEF DESCRIPTION OF THE DRAWINGS

Other features and advantages of the invention will become apparent from the following detailed description when taken in conjunction with the accompanying drawings, in which:

FIG. 2 is a flow chart for showing operations of the embodiment.

DETAILED DESCRIPTION OF THE PREFERRED EMBODIMENT OF THE INVENTION

Figure 1:
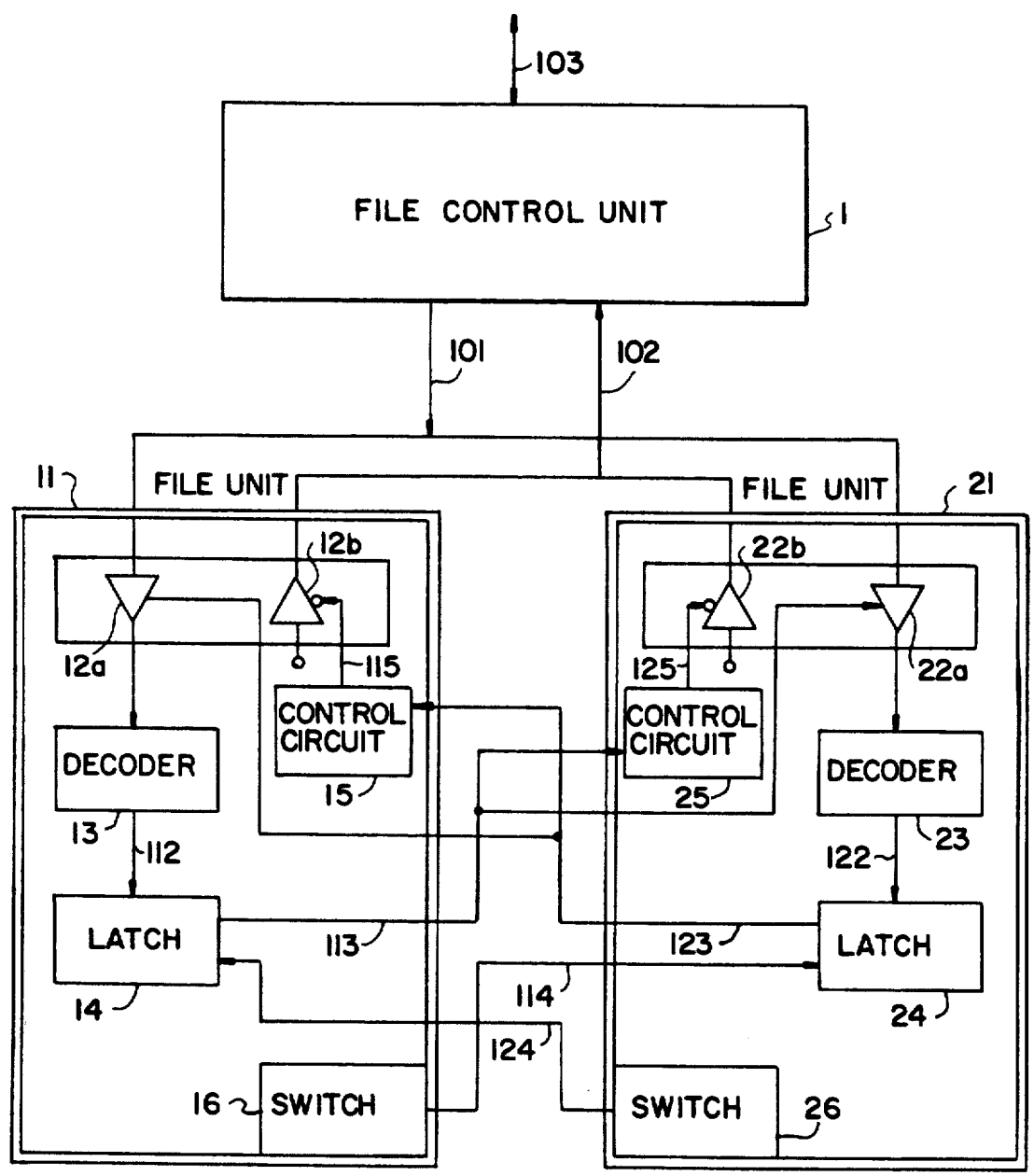
FIG. 1 is a block diagram of an embodiment of the invention.

Referring to FIG. 1, a embodiment of the present invention comprises an file control unit or peripheral control unit 1; file units 11 and 21 such as magnetic disk units or magnetic tape units; a first interface line group 101 of data signal lines and various control signal lines; and a second interface line group 102 of data signal lines and various control signal lines.

The unit 1, as disclosed in the U.S. Pat. No. 4,237,533 for example, is connected to a plurality of channel units (not shown) via a signal line group 103. The channel units are connected further to a host unit (not shown) such as a central processing unit (CPU). The unit 1 subjects data transfers between the host unit and each of the units 11 and 12 to microprogram control. Upon issuance of an access request, such as a read request or a write request, from the host unit, the unit 1 supplies the units 11 and 12 via the line group 101 with a specific sequence of commands according to the type of the issued request.

The unit 11 comprises a receiver circuit 12a connected to the line group 101; a decoder circuit 13 supplied with a part of the output of the circuit 12a; a latch relay circuit 14 given a part of the output of the circuit 13 via a signal line 112; a reset switch circuit 16; a driver circuit 12b connected to the line group 102; and a driver control circuit 15 for generating, and supplying to the circuit 12b, a prohibition signal to prohibit the circuit 12b from producing any signal to the line group 102.

The unit 21 includes a receiver circuit 22a connected to the line group 101 and a signal line 113; a decoder circuit 23 supplied with a part of the output of the circuit 22a; a latch relay circuit 24 which is connected to the circuit 16 via a signal line 114, is given a part of the output of the circuit 23 via a signal line 122, and is connected to the circuits 12a and 15 via a signal line 123; a reset switch circuit 26 connected to the circuit 14 via a signal line 124; a driver circuit 22b connected to the line group 102; and a driver control circuit 25 connected to the circuit 14 via the line 113, for generating, and supplying to the circuit 22b, a prohibition signal to prohibit the circuit 22b from producing any signal to the line group 102.

For brevity's sake, only such structural elements of the units 11 and 21 as are particularly relevant to the invention are shown in FIG. 1, and the description of the other structural elements of the units 11 and 21 not directly relevant thereto is dispensed with.

The circuit 12a receives a command and write data supplied from the unit 1 and, if no prohibition signal is given from the signal line 123, feeds the data to a write control circuit (not shown) while sending the command to the circuit 13. If given a prohibition signal, the circuit 12a is prohibited from producing any signal. The receiver circuit 22a operates in a similar manner to the circuit 12a.

The circuit 13 decodes the command provided from the circuit 12a to generate various control signals for controlling various circuit elements in the unit 11 to supply them to the associated circuit elements. If the command is a relay set command, the circuit 13 supplies a relay set signal to the line 112. The circuit 23 operates in a similar manner to the circuit 13.

The circuit 14 is set in response to the relay set signal given from the line 112, generates and supplies to the line 113 the prohibition signal, for instance, a logical "1" signal. The prohibition signal continues to be supplied from the circuit 14 until a relay reset signal is provided from the circuit 26 to the circuit 14, which can remain in operation even in the event of a failure of a main power supply source for feeding electrical power to all the circuit elements of the unit 11. The latch relay circuit 24 operates in a similar manner to the circuit 14. As a circuit to operate in this way there can be used a relay available from Matsushita Electric Works, Ltd. under the trade name two-coil latching type TQ relay.

The circuit 15 renders the circuit 12b operative only after the unit 11 has been selected in advance as a main file unit in response to a selection command from the unit 1 with no prohibition signal given via the line 123. In any other case, the circuit 15 keeps the circuit 12b inactive. When the circuit 12b is in operation, its output is in a high impedance state. The circuit 25 operates in a similar manner to the circuit 15.

The switch 16, manipulated by an operator, exclusively supplies a set signal and a reset signal to the line 114 to place the circuit 24 in a set state and a reset state, respectively. The circuit 26 operates in a similar manner to the switch 16.

A description will next be given concerning operation of the embodiment with reference to FIGS. 1 and 2.

First, a description will be briefly made concerning operation in the absence of a failure. Supposing that the units 11 and 21 have been selected in advance as a main file unit and as a back-up file unit, respectively. In a write operation, the data to be written, write addresses and a sequence of commands to control the writing of the data into a file on a disk medium are fed to the units 11 and 21, so that the same data are written into the files on the disk media of the units 11 and 21. At this time, the revision numbers of there files are updated as described above in connection with the conventional file system. Meanwhile, in a read operation, the read address of the data to be read out and a sequence of commands to control the reading-out are supplied to the units 11 and 21, so that the same desired data are read out of the disk media of both the units 11 and 21. Since the unit 21 is selected as the back-up file unit at this time, the circuit 22b comes into operation, and as a result only the data read out of the disk medium of the unit 11 are supplied to the unit 1 via the circuit 12b and the line group 102.

When the occurrence of a failure in the unit 11 operating as the main file unit is detected at a point of time $t_1$ from status information supplied via the signal group 102 (step P1 in FIG. 2), the unit 1, after issuing to the unit 21 a selection command for selecting the unit 21 as the main file unit (step P2), issues a relay set command for setting the circuit 24 (step P3). In response, the circuit 24 is set, and a prohibition signal is given to the circuits 12a and 15 via the line 123 (steps P4 and P5). When, if a failure arises at a point of time $t_3$ after the contents of the file A stored in the disk medium of the unit 21 are updated at a point of time $t_2$, the unit 1 issues a selection command for selecting the unit 11 as the main file unit, but this command is not accepted because the prohibition signal has been given to the circuit 12a. As a result, the unit 11 does not produce status information indicative of its selection as the main file unit. Therefore, the unit 1 recognizes the failures of both the units 11 and 21 and notifies the host unit of this fact to wait for recovery from the failures. Even if the unit 11 recovers from the failure at a point of time $t_4$ (step P6), no command from the unit 1 is accepted because of the continued supply of the prohibition signal from the circuit 24. Then, when the unit 21 also is restored to normalcy at a point of time $t_5$ (step P7) and the operator manipulates the circuit 16 (step P8) to supply a reset signal to the circuit 24. In response to the reset signal, the circuit 24 is reset to discontinue the supply of the prohibition signal. After that, when status information indicative of the recovery of the unit 11 is given from the unit 11 via the line group 102, the unit 1 compares the revision number of each file in the medium of the unit 11 with that of a corresponding file in the medium of the unit 21 and, if there is any unmatched pair of files whose revision numbers are different from each other, replaces the contents of the one file of the pair assigned the older revision number with those of the other file assigned the newer revision number to achieve consistency between the two disk media (steps P9 and P10).

If no failure occurs in the unit 21 at the point of time $t_3$, the operator issues a reset signal from the circuit 16 upon recovery of the unit 11 from the failure at the point of time $t_4$ (step P11). As a result, the above-mentioned processing for achieving consistency between the contents of the two disk media takes place (steps P12 and P13).

Although the circuits 16 and 26 are mounted within the respective housings of the units 11 and 21 in the embodiment, they may be placed in a separate housing. Further, although the driver circuits and receiver circuits are made inoperative by the prohibition signals from the latch relay circuits in the embodiment, arrangement may be so made as to supply the prohibition signals from the relay circuits to a power-supply-source control circuit to suspend the supply of electrical power to the circuit elements of the file units.

While this invention has thus far been described in conjunction with the preferred embodiment thereof, it will now readily be possible for those skilled in the art to put this invention into practice in various other manners.

What is claimed is:

1. A multiple file system including a host unit, a control unit responsive to an access request issued from said host unit for issuing a sequence of commands, and a main power supply source for supplying electrical power to file units, said multiple file system comprising:
   a plurality of said file units whose operation is controlled by said sequence of commands, said file units holding the same files, each file unit including a receiver circuit receiving said sequence of commands;
   an indicator circuit, said indicator circuit designated by a set command to produce a prohibition signal, said set command being issued by said control unit, said indicator circuit producing said prohibition signal regardless of a state of said main power supply source;

prohibiting means coupled to another receiver circuit of another file unit and responsive to said prohibition signal for prohibiting said another receiver circuit of said another file unit from receiving any commands, prohibiting means of each file unit being responsive to said prohibition signal issued from another file unit; and a reset circuit generating a reset signal for another indicator circuit to discontinue production of said prohibition signal, said indicator circuit in each file unit being responsive to said reset signal generated in another file unit.

2. A multiple file system as claimed in claim 1, wherein an output of said specific receiver said receiver circuits enters into a high impedance state in response to said prohibition signal provided via said prohibiting means.

3. A multiple file system as claimed in claim 1, wherein said prohibiting means suspends a supply of electrical power to said receiver circuits in response to said prohibition signal.

4. A method for controlling the operation of a plurality of file units by a sequence of commands issued from a control unit in response to an access request issued from a host unit, comprising the steps of:

providing said commands to be received by respective file units;

producing, within one of said plurality of file units, a prohibition signal upon designation by a set command from said control unit regardless of a state of main power supply to said plurality of file units;

applying said prohibition signal to another of said file units to inhibit specific reception of said commands by said another of said file units and generating a reset signal in one file unit, and applying said reset signal to another file unit to discontinue producing said prohibition signal in said another file unit.

5. A method as claimed is claim 4, wherein reception of said prohibition signal causes an output of said at least one of said file units to enter into a high impedance state.

6. A method as claimed is claim 4, wherein response to said prohibition signal causes suspension of a supply of electrical power in said at least one of said file units.

* * * * *